US008568168B2

(12) United States Patent
Han

(10) Patent No.: US 8,568,168 B2
(45) Date of Patent: Oct. 29, 2013

(54) WATERPROOF CONNECTOR AND METHOD OF PRODUCING RUBBER STOPPER

(75) Inventor: Chan Chung Han, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 70 days.

(21) Appl. No.: 13/235,827

(22) Filed: Sep. 19, 2011

(65) Prior Publication Data

US 2012/0077377 A1   Mar. 29, 2012

(30) Foreign Application Priority Data

Sep. 24, 2010   (JP) ................................. 2010-214310

(51) Int. Cl.
*H01R 13/40* (2006.01)
(52) U.S. Cl.
USPC ........................................................ 439/587
(58) Field of Classification Search
USPC .......................................... 439/587, 588, 589
See application file for complete search history.

(56) References Cited

U.S. PATENT DOCUMENTS

| | | | | |
|---|---|---|---|---|
| 4,944,688 A * | 7/1990 | Lundergan | ..................... | 439/275 |
| 4,998,896 A * | 3/1991 | Lundergan | ..................... | 439/595 |
| 5,145,410 A * | 9/1992 | Maejima et al. | ............. | 439/587 |
| 5,266,045 A * | 11/1993 | Yamamoto et al. | ........... | 439/275 |
| 5,618,206 A * | 4/1997 | Sawada et al. | ................ | 439/587 |
| 5,782,658 A * | 7/1998 | Maegawa et al. | ............. | 439/595 |
| 6,193,549 B1 * | 2/2001 | Suzuki et al. | ................. | 439/589 |
| 6,341,983 B1 * | 1/2002 | Crawford et al. | ............. | 439/587 |
| 6,371,807 B1 * | 4/2002 | Takagishi et al. | ............. | 439/587 |
| 6,383,022 B1 * | 5/2002 | Murakami et al. | ............ | 439/589 |
| 6,447,331 B1 * | 9/2002 | Fukatsu et al. | ................ | 439/516 |
| 6,599,153 B2 * | 7/2003 | Nishide | ......................... | 439/681 |
| 7,114,991 B2 | 10/2006 | Shiga et al. | | |
| 7,156,698 B2 * | 1/2007 | Yamashita | ..................... | 439/587 |
| 7,273,395 B2 * | 9/2007 | Hayashi | ........................ | 439/587 |
| 7,351,102 B2 * | 4/2008 | Cykon et al. | .................. | 439/587 |
| 7,371,115 B1 * | 5/2008 | Hsieh et al. | .................... | 439/587 |
| 8,257,111 B1 * | 9/2012 | Smutny et al. | ................ | 439/511 |
| 8,272,895 B2 * | 9/2012 | Park | .............................. | 439/587 |

* cited by examiner

*Primary Examiner* — Amy Cohen Johnson
*Assistant Examiner* — Vladimir Imas
(74) *Attorney, Agent, or Firm* — Gerald E. Hespos; Michael J. Porco; Matthew T. Hespos

(57) ABSTRACT

A waterproof connector has a housing (10) with a rearwardly open stopper accommodation part (20). A rubber stopper (50) is accommodated in the stopper accommodation part (20) and has wire insertion holes (52). A holder (70) is mounted on the housing (10) for preventing the rubber stopper (50) from being removed from the stopper accommodation part (20). A positioning part (58) is formed on the rubber stopper (50). A positioning receiving part (26) is formed on the stopper accommodation part (20) and mates with the positioning part (58) when the rubber stopper (50) is in a correct posture so that the rubber stopper (50) can fit in the stopper accommodation part (20). The positioning part (58) interferes with the positioning receiving part (26) when the rubber stopper (50) is in an incorrect posture so that the rubber stopper (50) cannot fit in the stopper accommodation part (20).

5 Claims, 8 Drawing Sheets

WATERPROOF CONNECTOR AND METHOD OF PRODUCING RUBBER STOPPER

BACKGROUND OF THE INVENTION

1. Field of the Invention.

The invention relates to a waterproof connector and a method of producing a rubber stopper to be used for the waterproof connector.

2. Description of the Related Art.

U.S. Pat. No. 7,114,991 discloses a waterproof connector with a housing that has cavities, each of which can accommodate a terminal fitting. An open rubber stopper accommodation part is formed on a rear surface of the housing and a rubber stopper is accommodated in the rubber stopper accommodation part. The rubber stopper has a plurality of electric wire insertion holes that communicate with the respective cavities. A holder is mounted on the housing and prevents the rubber stopper from being removed from the rubber stopper accommodation part.

The rubber stopper has the shape of a rectangular mat with a predetermined thickness and has four rounded corners when viewed from the front and rear.

The conventional rubber stopper may be inverted when accommodated in the rubber stopper accommodation part. Thus, it is necessary to check the construction of each of the upper and lower surfaces of the rubber stopper, and it may be necessary to perform the stopper accommodation work again, thereby increase the work for an operator.

The invention has been completed based on the above-described situation, and it is an object of the invention to ensure proper mounting of a rubber stopper on a housing.

SUMMARY OF THE INVENTION

The invention relates to a waterproof connector with a housing that has cavities, each of which can accommodate a terminal fitting. A stopper accommodation part is open at a rear surface of the housing and a rubber stopper can be accommodated in the stopper accommodation recess. The stopper has electric wire insertion holes that communicate with the respective cavities. A holder is mounted on the housing and prevents the stopper from being removed from the stopper accommodation part. A positioning part is formed on the rubber stopper and a positioning receiving part is formed on the stopper accommodation part or the holder. The positioning part and the positioning receiving part fit together when the rubber stopper is in the correct posture relative to the stopper accommodation part or the holder so that the rubber stopper can be accommodated in the stopper accommodation part or on the holder. However, the positioning part interferes with the positioning receiving part when the rubber stopper is in an incorrect posture relative to the stopper accommodation part or the holder so that the rubber stopper cannot be accommodated in the stopper accommodation part or on the holder. Therefore the rubber stopper cannot be mounted in the stopper accommodation part or on the holder in an erroneous posture and proper mounting of the rubber stopper is assured.

The cavities may be of several sizes for accommodating terminal fittings of different sizes. The cavities may be located at dot-symmetrical positions when the stopper accommodation recess is viewed from the rear. The positioning part is inwardly concave over a whole thickness range of the rubber stopper at dot-symmetrical positions of a peripheral portion of the rubber stopper. The positioning receiving part preferably is on an inner surface of a peripheral wall of the stopper accommodation part or an inner surface of a peripheral wall of the holder at dot-symmetrical positions corresponding to positions of the positioning part. Therefore even if the rubber stopper rotates 180 degrees on its central position, the rubber stopper can be mounted on the stopper accommodation recess or the holder. Consequently, there is no need to care about whether the rubber stopper is upside down, thereby lightening the workload of the operator.

Two lips preferably are formed side by side in a thickness direction of the rubber stopper along an entire periphery of the rubber stopper. The positioning part includes a concavity at a valley disposed between the lips in a depth direction thereof. The concavity is formed by a sliding die movable in a plane direction of the rubber stopper. A prior art rubber stopper formed by a pair of dies may attach to the movable die when the dies are opened. However, the above-described sliding die prevents the rubber stopper from attaching to the movable die when the dies are opened. Further the concavity of the positioning part is formed by the sliding die, thereby avoiding complexly constructed dies.

The concavity preferably is formed at one side of a specified wire insertion hole near the periphery of the rubber stopper. A concave cut-off part is formed in the depth direction of the valley between the lips at the other side of the specified wire insertion hole. Thus, a half-circumference region on a periphery of the specified wire insertion hole and near a side edge of the rubber stopper has an almost equal radial dimension throughout an entire circumference. As a result, the rubber stopper imparts an almost uniform elastic reaction force to the half-circumference region of the electric wire inserted through the specified wire insertion hole and the periphery of the electric wire is sealed with a favorable balance.

The invention also relates to a method for producing a rubber stopper that has electric wire insertion holes and two lips. The lips are formed side by side in a thickness direction of the rubber stopper and extend around the entire periphery of the rubber stopper. The method includes providing two dies for forming upper and lower surfaces of the rubber stopper and the electric wire insertion holes and a sliding die for forming a valley between the lips. The method continues by moving at least one of the dies away from the other while keeping the sliding die in the valley between the lips. Thus, the rubber stopper will not attach to one of the dies as the dies are opened. The method proceeds by moving the sliding die along a plane direction of the rubber stopper, and then removing the dies and the sliding die from the resulting rubber stopper.

The method also preferably includes forming a positioning part at a specified position on the periphery of the rubber stopper for preventing the rubber stopper from being mounted on an object in an incorrect posture. The step of forming the positioning part preferably includes forming a concavity at a valley between the lips in a depth direction thereof. The concavity is formed by the sliding die. Thus, there is no need to use a dedicated die for forming the concavity and the dies have a less complicated construction.

The concavity preferably is formed at one side of a specified wire insertion hole near the periphery of the rubber stopper. The method also preferably includes forming a cut-off concave part in the depth direction of the valley between the lips and at other side of the specified wire insertion hole. Thus, a half-circumference region on a periphery of the specified wire insertion hole has almost an equal radial dimension throughout an entire circumference. The cut-off part is formed by the sliding die. Thus, there is no need for a dedicated die to form the cut-off part and the dies have a less complicated construction.

DETAILED DESCRIPTION OF THE PREFERRED EMBODIMENTS

A waterproof connector in accordance with the invention has a housing 10, a rubber stopper 50, a holder 70, and terminal fittings 80, as shown in FIGS. 1 through 9. The housing 10 can be fit on an unshown mating housing. The end of the housing 10 that can be fit on the mating housing is referred to herein as the front.

Figure 4:
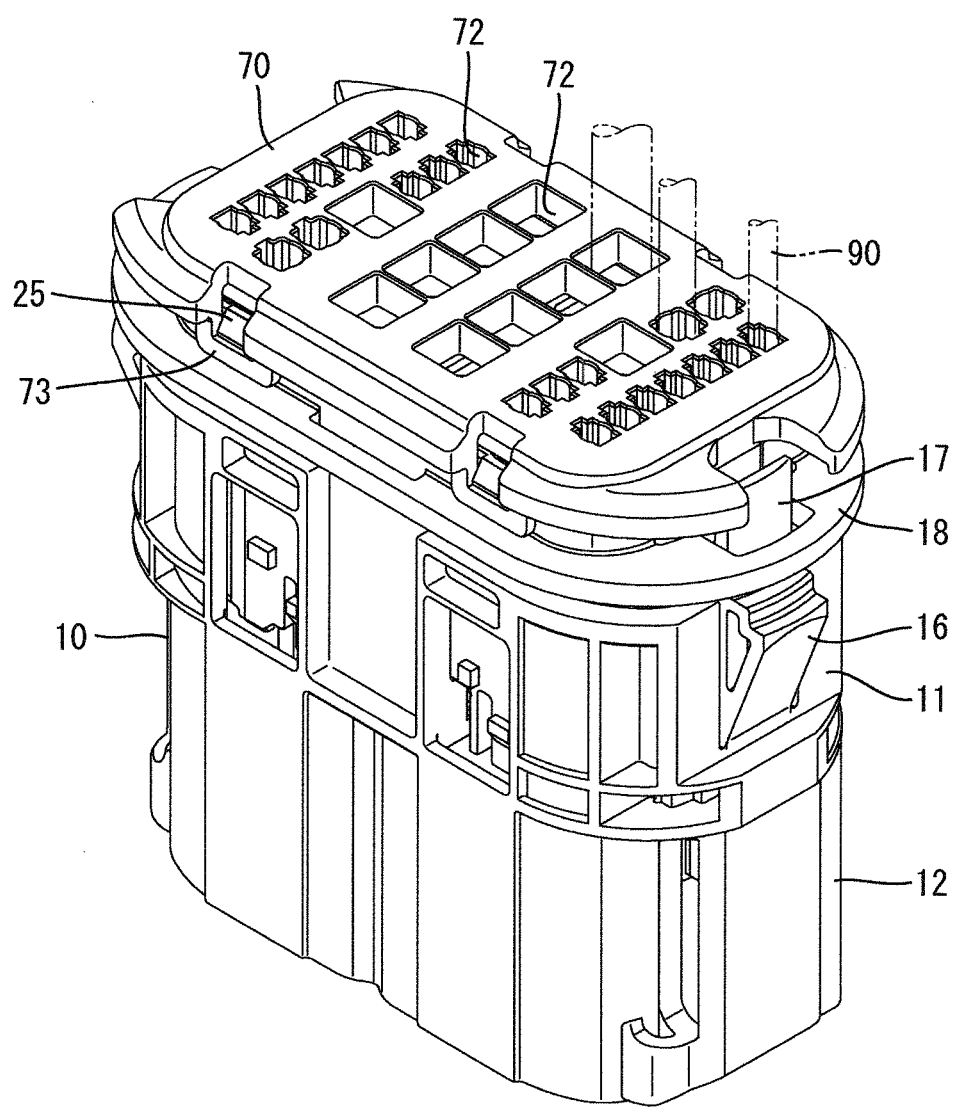
FIG. 4 is a perspective view of the connector.
Figure 5:
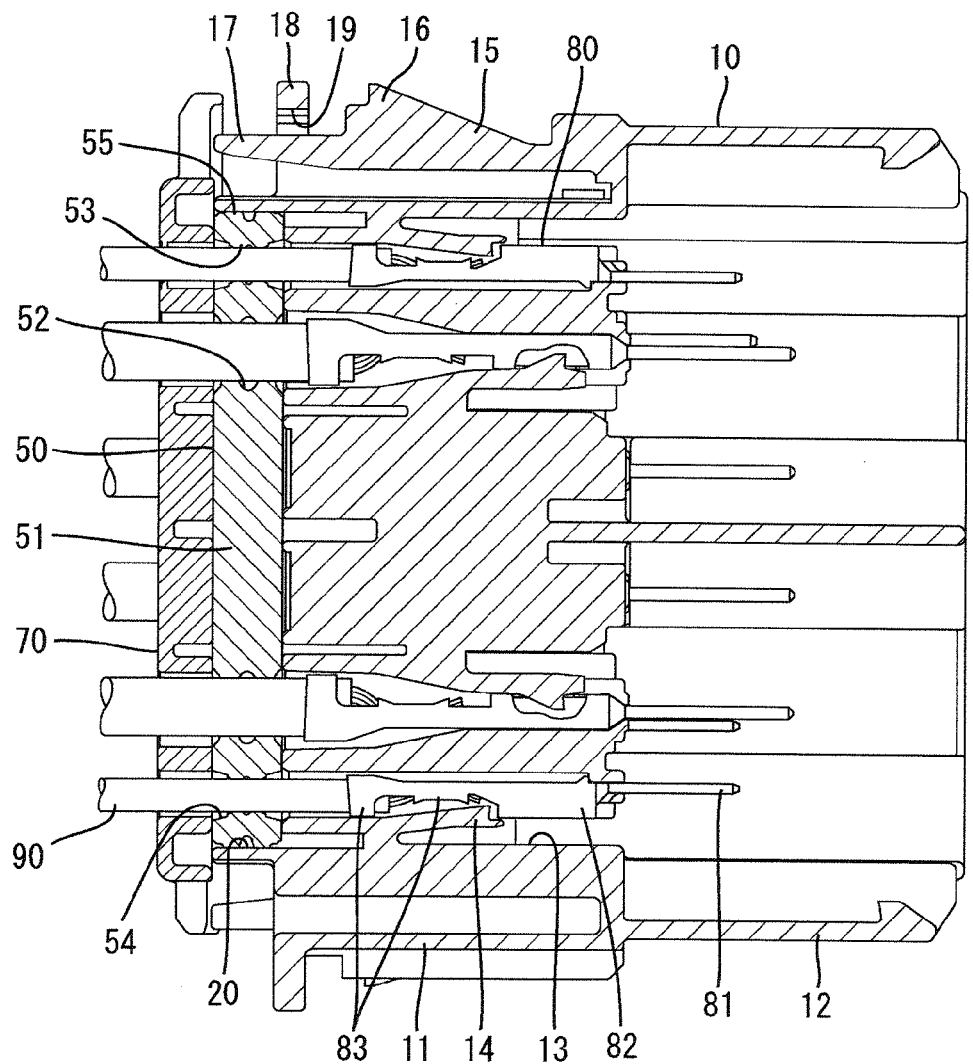
FIG. 5 is a sectional view of the connector.

As shown in FIGS. 4 and 5, the housing 10 has a block-shaped body 11 long in the height direction and a tubular hood 12 projects forward from the periphery of a front end of the body 11. Cavities 13 penetrate through the body 11 in front to rear directions and are arranged in height and width directions. A flexible lance 14 projects forward from an inner wall of each cavity 13. One of the terminal fittings 80 is inserted into each cavity 13 from the rear, and the properly inserted terminal fitting 80 is locked in the cavity 13 by the lance 14.

The terminal fittings 80 are formed by punching a conductive metal plate and thereafter bending the obtained conductive metal plate. Each terminal fitting 80 has a body 82, a tab 81 that projects forward from the body 82 and a barrel 83 rearward of the body 82. The tab 81 projects into the hood 12 when the terminal fitting 80 is inserted correctly into the cavity 13. The barrel 83 is crimped into connection with an end of an electric wire 90.

Not all of the terminal fittings 80 are the same size, and the sizes of the cavities 13 conform to the sizes of the respective terminal fittings 80. More particularly, large cavities 13 are disposed at a central portion of the housing body 11 in the height direction, whereas the small cavities 13 are disposed at upper and lower sides of the housing body 11 in the vertical direction. The cavities 13 are disposed symmetrically with respect to the central portion of the housing body 11.

Flexible panel locks 15 are formed on a peripheral surface of the housing body 11 and a locking claw 16 projects out from an outer surface of each of the panel lock 15. A release operation part 17 extends at a rear end of the panel lock 15. A projected flange 18 is formed entirely at a rear end portion of the outer periphery of the housing body 11. An escape hole 19 penetrates through the flange 18 and accommodates the release operation part 17. The panel lock 15 can be flexed to pass through a hole in an unillustrated panel and then resiliently returns to sandwich the panel between the locking claw 16 and the flange 18 for holding the housing 10 on the panel.

Figure 2:
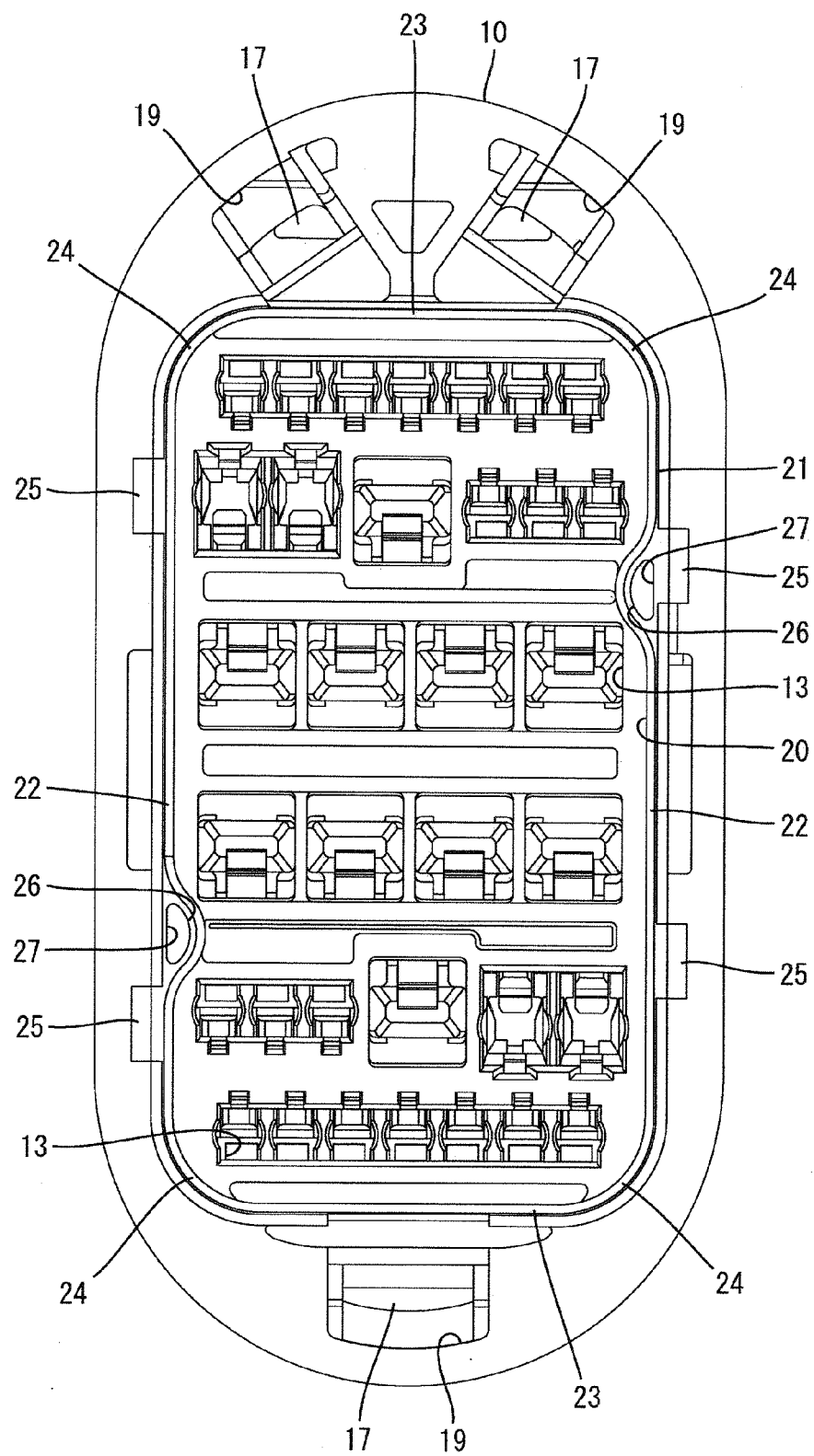
FIG. 2 is a rear view of the housing.

A rubber stopper accommodation recess 20 is open at the rear of the housing body 11. The rubber stopper accommodation recess 20 is defined by a thin peripheral wall 21 that projects from the rear end of the housing body 11. As shown in FIG. 2, the peripheral wall 21 is defined by two substantially parallel longitudinal plates 22 that extend in the height direction and two substantially parallel widthwise plates 23 that extend in the width direction. Circular arc-shaped curved plates 24 are positioned at four corners of the peripheral wall 21 and connect ends of the longitudinal plates 22 to ends of the widthwise plates 23. The above-described release operation part 17 of the panel lock 15 is disposed outward of the widthwise plates 23. Two holder lock receiving parts 25 project from an outer surface of each longitudinal plate 22 and are spaced apart in the height thereof.

A positioning receiving part 26 is formed on an inner surface of each of the longitudinal plates 22. Left and right positioning receiving parts 26 bulge in the shape of a circular arc toward the inside of the rubber stopper accommodation recess 20 and each has a space 27 therein. The right positioning receiving part 26 is disposed above the center of the peripheral wall 21 in the height direction when the housing body 11 is viewed from the rear, and the left positioning receiving part 26 is disposed below the center of the peripheral wall 21 in the height direction when the housing body 11 is viewed from the rear. Similarly to the cavities 13, the right and left positioning receiving parts 26 are disposed symmetrically with respect to the central portion of the housing body 11.

Figure 6:
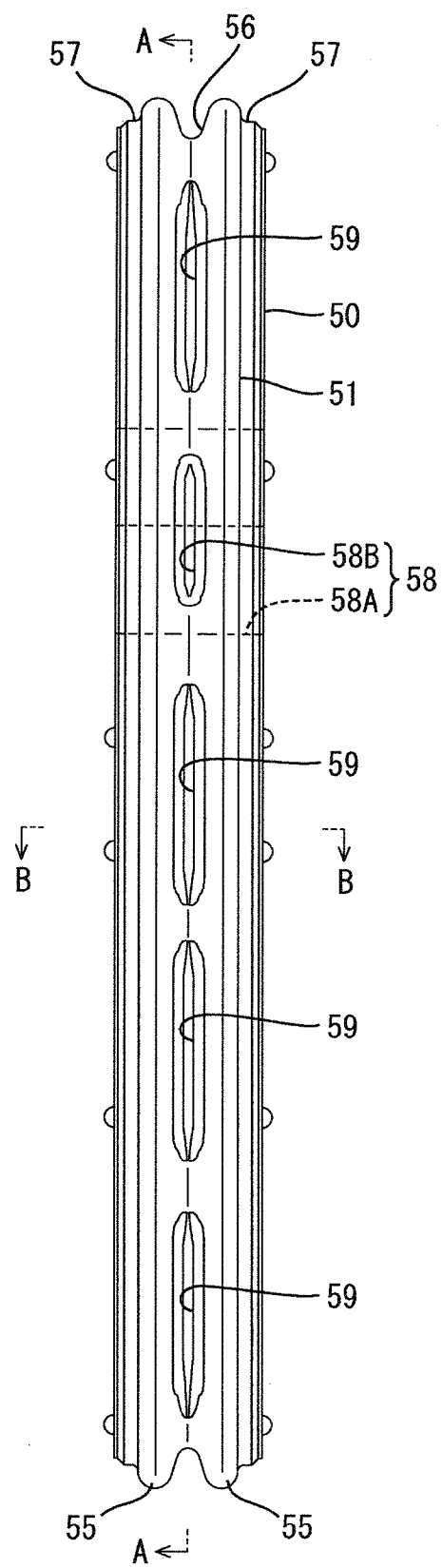
FIG. 6 is a side view of the rubber stopper.
Figure 7:
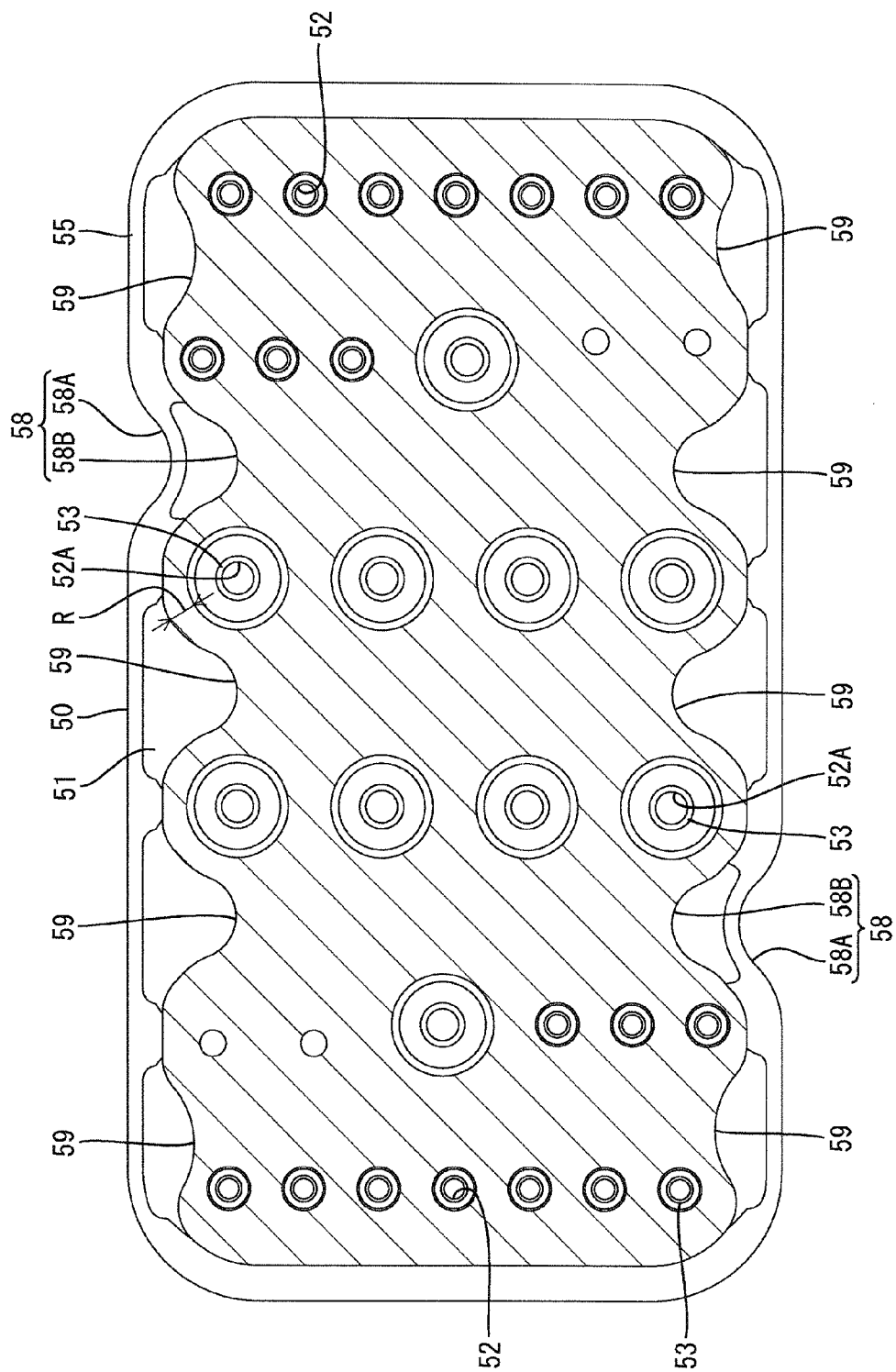
FIG. 7 is a sectional view taken along a line A-A of FIG. 6.
Figure 8:
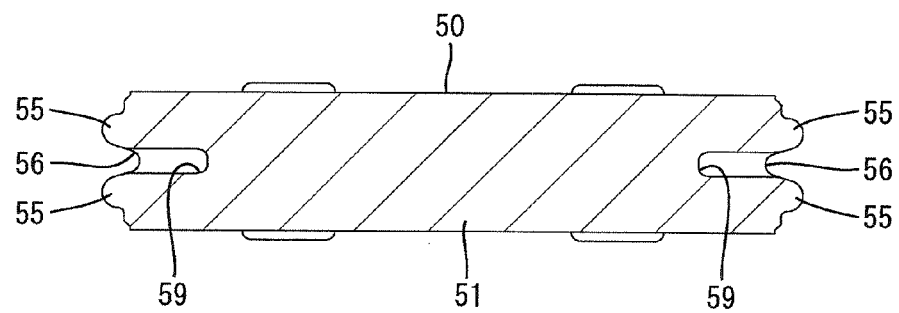
FIG. 8 is a sectional view taken along a line B-B of FIG. 6.

The rubber stopper 50 is made of rubber, such as silicone rubber. As shown in FIGS. 6 through 8, the rubber stopper 50 has a mat-shaped stopper body 51 that is long in the height direction. The stopper body 51 is dimensioned to fit in the stopper accommodation recess 20 and is formed with wire insertion holes 52 that register with the cavities 13 when the rubber stopper 50 is accommodated in the stopper accommodation recess 20. The electric wire insertion holes 52 have different sizes and are disposed in correspondence to the differently dimensioned cavities 13. Inner lips 53 are formed circumferentially on the inner periphery of each of the electric wire insertion holes 52. A trumpet-shaped guide surface 54 is formed around each of the wire insertion holes 52 on the lower surface of the stopper body 51 for guiding the terminal fitting 80.

Two lips 55 are formed substantially side by side on the periphery of the rubber stopper body 51 in the thickness direction (longitudinal direction) and each lip 55 extends around the entire periphery of the stopper body 51. A valley 56 with a substantially U-shaped cross section is defined between the lips 55. Flat surfaces 57 extend around the periphery of the stopper body 51 forward and rearward (up and down) of the lips 55 and are continuous with the respective lips 56 at a step. A bottom portion of the valley 56 is cut deeper into the rubber stopper body 51 than the flat surface 57.

Left and right concave positioning parts 58 are formed on the long side edges of the periphery of the stopper body 51. The right positioning part 58 is disposed above the center of the stopper body 51 in the height direction when the stopper body 51 is viewed from the rear and the left positioning part 58 is disposed below the center of the stopper body 51 in the height direction when the stopper body 51 is viewed from the rear. Both positioning parts 58 are disposed at dot-symmetrical positions with respect to the central position of the stopper body 51.

Each positioning part 58 includes a positioning body 58A and a concavity 58B. The positioning body 58A is approximately U-shaped in front and rear views and is cut out over the entire thickness range of the stopper body 51. Thus, each lip 55 has the positioning body 58A and a concave portion toward the inside of the stopper body 51.

The concavity 58B is formed in the valley 56 continuous with the positioning body 58A and the portion deeply concave toward the inside of the stopper body 51 from the bottom of the valley 56. Cut-off parts 59 are formed at the bottom of the valley 56 at certain intervals in the height direction. Similar to the concavities 58B, the cut-off parts 59 are deeply concave toward the inside of the stopper body 51 and are arranged alongside the concavities 58B in the direction of the height of the stopper body 51. The cut-off parts 59 and the concavities 58B are disposed to partly surround wire insertion holes 52A near the side edges of the stopper body 51.

More specifically, one concavity 58B is formed at each side edge of the stopper body 51 near where the large electric wire insertion holes 52A are arranged and one of the cut-off parts 59 is formed at the opposite side edge of the stopper body 51 at a height position to oppose the concavity 58B. The cut-off part 59 and the concavity 58B that are disposed on the same side edge of the stopper body 51 and adjacent to one of the electric wire insertion hole 52A are at substantially opposite sides of the wire insertion hole 52A in the height direction and have bottom surfaces at equal depth positions. Thus, a half-circumference region of almost constant radius R is defined near the side edge of the stopper body 51 and around approximately half of the periphery of the wire insertion hole 52A. The half-circumference region is disposed at both side edges of the rubber stopper 50. The rubber stopper 50 has a dot-symmetrical or point symmetrical configuration with respect to the central position thereof.

Figure 3:
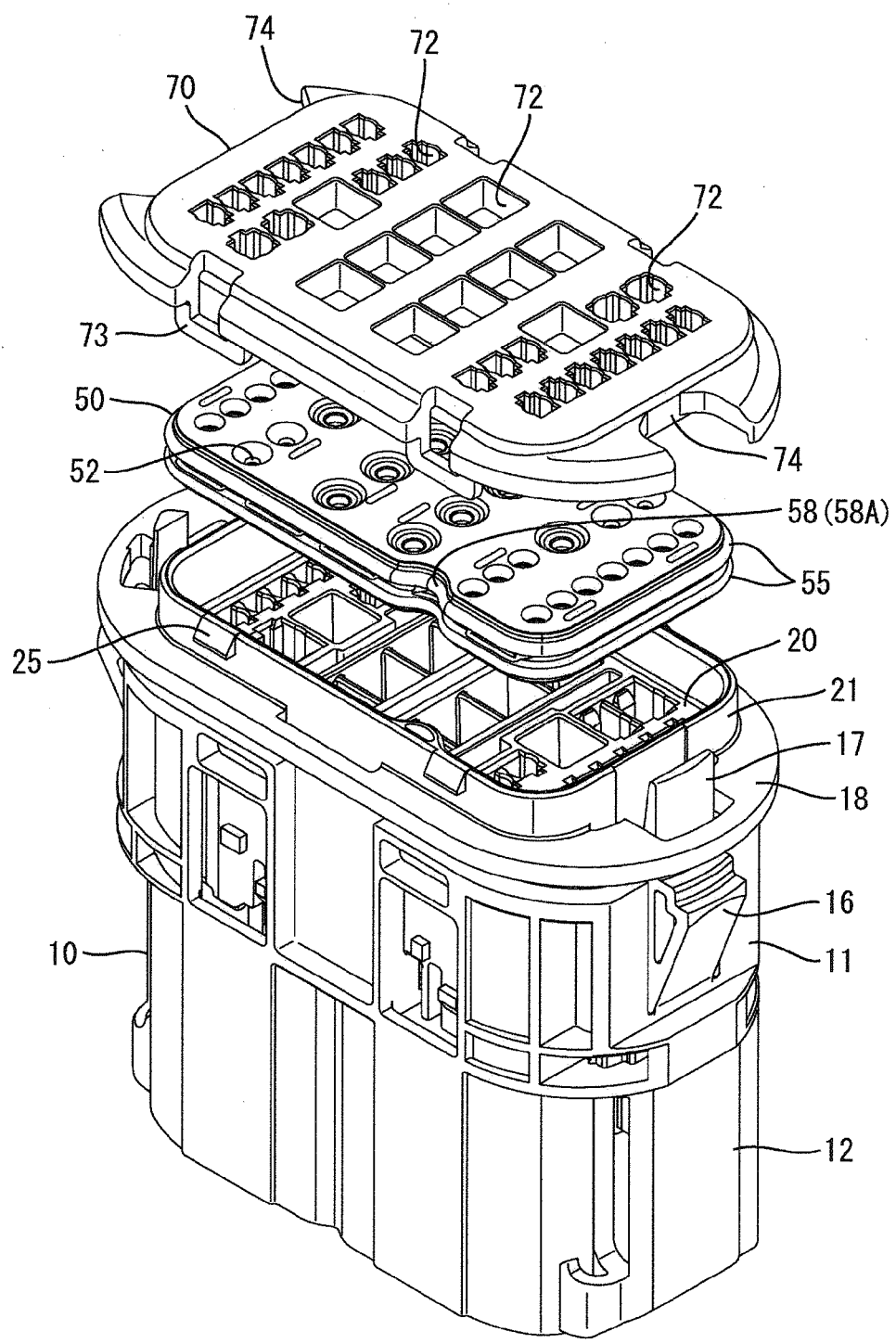
FIG. 3 is an exploded perspective view of a connector.

The holder 70 is made of synthetic resin. As shown in FIGS. 3 and 4, the holder 70 defines a plate that is long in the height direction. Wire passing holes 72 penetrate through the holder 70 at positions corresponding to the wire insertion holes 52. Each wire passing hole 72 has an approximately rectangular configuration corresponding to the sectional outer configuration of the terminal fitting body 82 and has a size allowing the electric wire 90 to be inserted freely therethrough. Two vertically spaced holder-locking parts 73 are formed on each side edge of the holder 70 and project forward. An escape concavity 74 is formed at each of the upper and lower edges of the holder 70 and can receive the release operation part 17 of the panel lock 15. The holder 70 is mounted on the housing 10 from the rear so that the holder 70 covers the rubber stopper 50 inserted into the stopper accommodation recess 20. When the holder 70 is mounted correctly on the housing 10, each holder lock 73 elastically locks the corresponding holder locking receiving part 25 to hold the holder 70 on the housing 10.

Figure 9:
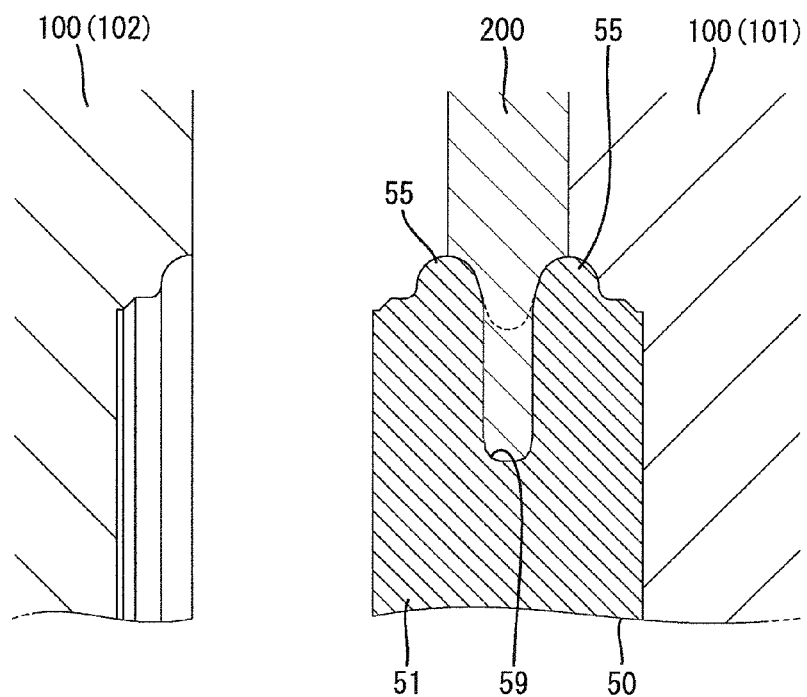
FIG. 9 is a sectional view showing a state in which the rubber stopper is formed by a molding die.

As shown in FIG. 9, two dies 100 and a sliding die 200 are used to mold the rubber stopper 50 from a molding resin that comprises a rubber material. The dies 100 are used to form the upper and lower surfaces of the rubber stopper 50, the wire insertion holes 52, the positioning body 58A, and the flat surfaces 57. One of the dies 100 is set as a movable die 102 and is movable to approach and separate from a fixed die 101. The sliding die 200 is used to form the concavities 58B, the cut-off parts 59 and the valley 56. The sliding die 200 is movable substantially orthogonal to the moving direction of the movable die 102.

Initially both dies 101, 102 and the sliding die 200 are closed to define an internal space. Thereafter the resin comprising the rubber material is filled in the internal space and hardened. At this time, both dies 101, 102 form the upper and lower surfaces of the rubber stopper 50, the wire insertion holes 52, and the flat surfaces 57, whereas the sliding die 200 forms the concavities 58B, the cut-off parts 59, and the valley 56. After molding of the rubber stopper 50 finishes, the movable die 102 is moved to separate from the fixed die 101. As a result, the upper and lower surfaces of the rubber stopper 50 are exposed. At this time, the sliding die 200 remains in a state penetrated into the concavity 58B, the cut-off part 59, and the valley 56, thus preventing the rubber stopper 50 from attaching to the movable die 102 and following the movement thereof. After the movement of the dies 100 finishes, the sliding die 200 is moved along a plane direction of the rubber stopper 50. As a result, the valley 56 and the like are exposed. In this way, both dies 100 and the sliding die 200 are removed from the resulting rubber stopper 50.

Figure 1:
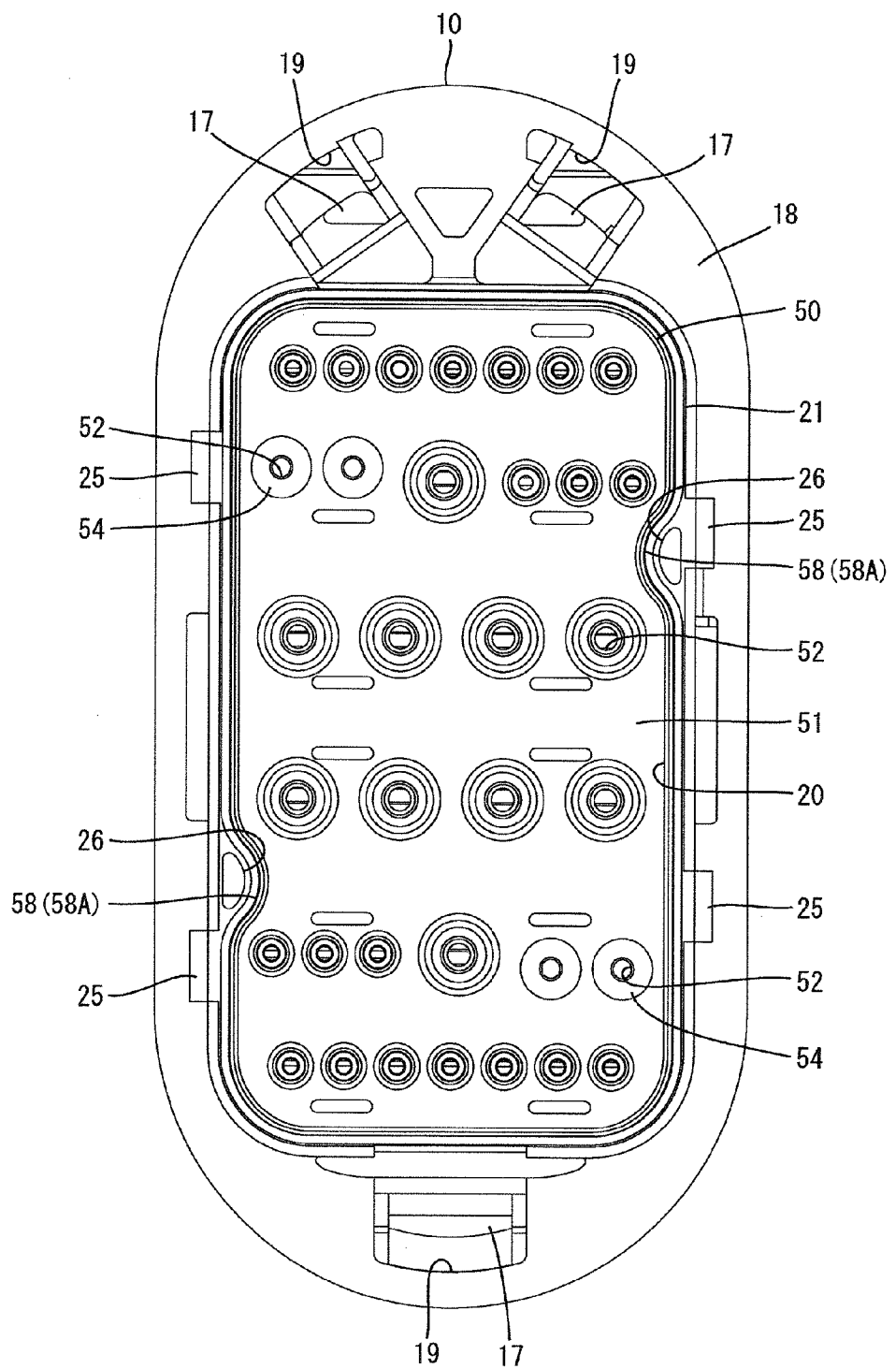
FIG. 1 is a rear view showing a state in which a rubber stopper is mounted on a rubber stopper accommodation part of a housing in accordance with the invention.

As shown in FIG. 1, the rubber stopper 50 is fit in the stopper accommodation recess 20 of the housing 10 from the rear. Both lips 55 of the rubber stopper 50 are brought elastically into close contact with the inner surface of the peripheral wall 21 when the positioning body 58A of the positioning part 58 is fit on the positioning receiving part 26. Thereafter, as shown in FIG. 4, the holder 70 is mounted on the housing 10 to cover the rubber stopper 50 from the rear. Engagement between the holder lock 73 and the holder lock receiving part 25 retain the holder 70 on the housing 10. Thus, the rubber stopper 50 is prevented from being removed from the housing 10. Thereafter, as shown in FIG. 5, the terminal fittings 80 that have been crimped to the electric wires 90 are inserted into the respective cavities 13 of the housing 10. The terminal fittings 80 are inserted into the cavities 13 from the electric wire passing holes 72 through the electric wire insertion holes 52. The inner periphery lips 53 of the rubber stopper 50 are brought elastically into close contact with the peripheral surface of the electric wire 90 when the terminal fitting 80 is inserted correctly into the cavity 13. Thus, the gap between the rubber stopper 50 and the electric wire 90 is sealed liquid-tightly, and the gap between the electric wire 90 and the housing 10 also is sealed liquid-tightly by the rubber stopper 50.

In the above-described construction, the positioning part 58 of the rubber stopper 50 cannot fit on the positioning receiving part 26 of the housing 10 and interferes with both side edges of the stopper body 51 during an attempt to insert the rubber stopper 50 into the rubber stopper accommodation recess 20 with the rubber stopper 50 upside down. Thus, the upside down rubber stopper 50 cannot be fit into the rubber stopper accommodation recess 20. A worker then inverts the rubber stopper 50 and inserts the properly oriented rubber stopper 50 into the rubber stopper accommodation recess 20. Thus the rubber stopper 50 is assured of being mounted properly on the housing body 11.

The rubber stopper 50 has a dot-symmetrical or point-symmetrical configuration. Thus when the rubber stopper 50 rotates 180 degrees on its central position, the rubber stopper 50 has the same form as that before it rotates. Further because the positioning receiving part 26 of the housing 10 is located at the position corresponding to the positioning part 58, it is possible to mount the rubber stopper 50 on the housing body 11 without caring about whether the rubber stopper 50 is erroneously turned upside down. Therefore operator's workload in mounting the rubber stopper 50 on the housing body 11 is lightened.

After the rubber stopper 50 is formed, the dies 100 are opened with the sliding die 200 penetrated into the valley 56 between the lips 55. Thus, the sliding die 200 prevents the rubber stopper 50 from attaching to the movable die 102.

In this construction, the concavity 58B of the positioning part 58 is formed by the sliding die 200. A dedicated die is not needed to form the concavity 58B, thereby simplifying the construction of the dies 100. In addition, the cut-off part 59 is formed by the sliding die 200. Hence, there is no need for a dedicated die to form the cut-off part 59, thereby further avoiding a complicated construction for the dies 100.

The wire insertion hole 52A adjacent the edges of the rubber stopper 50 are interposed between the concavity 58B and the cut-off part 59. Thus, a half-circumference region on the periphery of the wire insertion hole 52A near the side edge of the rubber stopper 50 has almost an equal radial dimension R. Therefore the rubber stopper 50 imparts almost a uniform elastic reaction force to the half-circumference region of the electric wire 90 inserted through the wire insertion hole. Therefore the periphery of the electric wire 90 is sealed with a favorable balance.

The invention is not limited to the embodiments described above with reference to the drawings. For example, the following embodiments are also included in the technical scope of the invention.

An accommodation region for the stopper may be concavely formed on the front surface of the holder. The positioning receiving part may be formed on the inner surface of the peripheral wall of the accommodation region.

The cut-off part of the stopper body may be concavely formed deeper than the concavity thereof. In this construction, a portion of the sliding die for forming the cut-off part has a deeper degree of hang-up than a portion of the sliding die for forming the concavity. Thus it is possible to securely prevent the die from being opened with the rubber stopper attaching to the movable die.

The inside of the electric wire insertion hole corresponding to a vacant cavity may be blocked by a projection on the holder.

The housing may be a female housing having cavities capable of respectively accommodating female terminal fittings not having a tab.

What is claimed is:

1. A waterproof connector, comprising:
    a housing having cavities for accommodating terminal fittings and an open stopper accommodation part at a rear end of the housing, the cavities being of different sizes for accommodating differently dimensioned terminal fittings respectively, the cavities be at dot-symmetrical positions when the stopper accommodation part is viewed from a rear thereof;
    a rubber stopper accommodated in the stopper accommodation part and having wire insertion holes communicating respectively with the cavities, at least one positioning part being formed on the rubber stopper, the positioning part being inwardly concavely over a whole thickness range of the rubber stopper at dot-symmetrical positions of a peripheral portion of the rubber stopper; and
    a holder mounted on the housing for preventing the rubber stopper from being removed from the stopper accommodation part; and
    at least one positioning receiving part formed on an inner surface of a peripheral wall of the stopper accommodation part or an inner surface of a peripheral wall of the holder at a at dot-symmetrical positions corresponding to positions of said positioning part to mate with the positioning part when the rubber stopper is in a correct posture relative to the stopper accommodation part or the holder so that the rubber stopper can be accommodated in the stopper accommodation part or the holder, and the positioning part interfering with the positioning receiving part when the rubber stopper is in an incorrect posture relative to the stopper accommodation part or the holder so that the rubber stopper cannot be accommodated in the stopper accommodation part or on the holder.

2. A waterproof connector, comprising:
    a housing having cavities for accommodating terminal fittings and an open stopper accommodation part at a rear end of the housing;
    a rubber stopper accommodated in the stopper accommodation part and having wire insertion holes communicating respectively with the cavities, at least one positioning part (58) being formed on the rubber stopper, two lips being formed substantially side by side in a thickness direction of the rubber stopper and extending around an entire periphery of the rubber stopper, the positioning part including a concavity concavely formed at a valley between the lips in a depth direction thereof;
    a holder mounted on the housing for preventing the rubber stopper from being removed from the stopper accommodation part; and
    at least one positioning receiving part formed on the stopper accommodation part or the holder at a position to mate with the positioning part when the rubber stopper is in a correct posture relative to the stopper accommodation part or the holder so that the rubber stopper can be accommodated in the stopper accommodation part or the holder, and the positioning part interfering with the positioning receiving part when the rubber stopper is in an incorrect posture relative to the stopper accommodation part or the holder so that the rubber stopper cannot be accommodated in the stopper accommodation part or on the holder.

3. The waterproof connector of claim 2, wherein the concavity is formed at one side of one of the wire insertion holes disposed near the periphery of the rubber stopper; and a cut-off part is concavely formed in the depth direction of the valley between the lips, the cut-off part being disposed at a side of the one wire insertion hole substantially opposed to the concavity, so that a half-circumference region disposed on a periphery of the one wire insertion hole and near a side edge of the rubber stopper has a substantially equal radial dimension throughout an entire half circumference thereof.

4. A waterproof connector, comprising:
    a housing having cavities for accommodating terminal fittings and an open stopper accommodation recess at a rear end of the housing, at least one positioning receiving part projecting into the stopper accommodation recess; and
    a rubber stopper configured for accommodation in the stopper accommodation recess and having wire insertion holes registered respectively with the cavities when the rubber stopper is oriented properly, at least one positioning part being formed at an outer periphery of the rubber stopper, the positioning part being disposed and configured to mate with the positioning receiving part when the rubber stopper is oriented properly relative to the stopper accommodation recess, the positioning part interfering with the positioning receiving part when the rubber stopper is oriented improperly relative to the stopper accommodation recess so that the rubber stopper cannot be accommodated in the stopper accommodation recess wherein two lips are formed substantially side by side in a thickness direction of the rubber stopper and extend around the outer periphery of the rubber stopper, the positioning part including a concavity at a valley between the lips in a depth direction of the valley.

5. The waterproof connector of claim 4, wherein the concavity (58B) is formed at one side of one of the wire insertion holes (52) disposed near the outer periphery of the rubber stopper (50).

* * * * *